Figure 1:
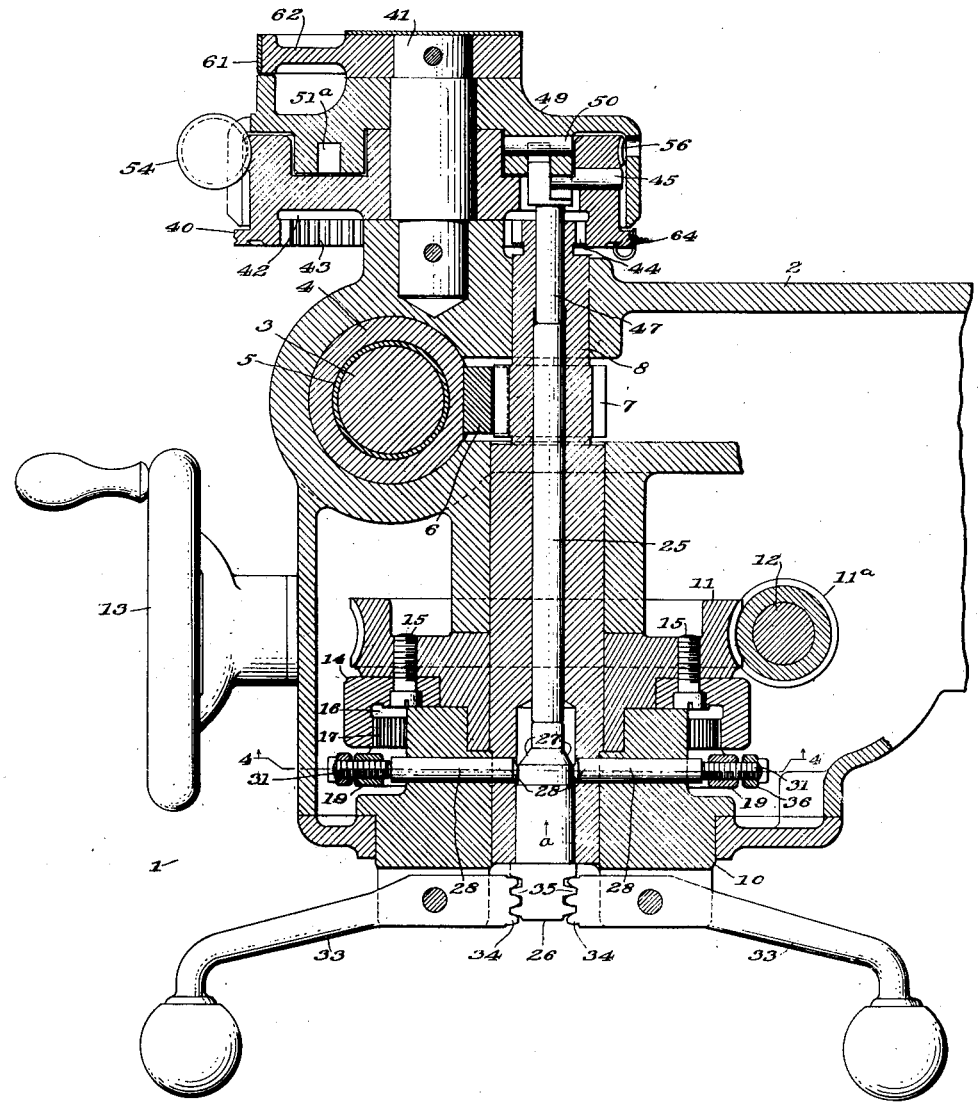

June 5, 1928.

D. C. KLAUSMEYER ET AL 1,672,128

UPRIGHT DRILL DEPTH GAUGE

Filed March 31, 1925

2 Sheets-Sheet 1

Inventors
David C. Klausmeyer
Joseph Utz
By Attorney
Albert F. Nathan

June 5, 1928.

D. C. KLAUSMEYER ET AL 1,672,128

UPRIGHT DRILL DEPTH GAUGE

Filed March 31, 1925

2 Sheets-Sheet 2

Inventors
David C. Klausmeyer
Joseph Utz
By Attorney
Albert F. Nathan

Patented June 5, 1928.

1,672,128

UNITED STATES PATENT OFFICE.

DAVID C. KLAUSMEYER AND JOSEPH UTZ, OF CINCINNATI, OHIO.

UPRIGHT-DRILL DEPTH GAUGE.

Application filed March 31, 1925. Serial No. 19,647.

Our invention is concerned with mechanism for gauging the depth of holes drilled by a drilling machine and is concerned particularly in mechanism adapted not only to gauge the depth of the holes drilled by a drilling machine but also to mechanism for stopping the linear movement of a drill spindle on a drilling machine when near either extreme end of its travel.

In operating a drilling machine, it is desirable to effect feeding movement of the drill by means of a power operated transmission mechanism. Moreover, it is very desirable in a drilling machine to accurately gauge the depth of the holes to be drilled. Furthermore, it is a very desirable feature in a drilling machine, having a power operated transmission mechanism, for effecting the feeding, to automatically disconnect the transmission mechanism from the drill spindle when the latter is near either extreme end of its travel.

Drilling machines have been constructed wherein a sleeve member, which carries the drill spindle, is given a movement of translation for effecting feeding or traversing movement by the drilling tool. The sleeve carries a rack which is engaged by a pinion carried by a transverse shaft. The transverse shaft is operated manually to effect traverse movements by the drilling spindle and is operated by power transmission mechanism to effect feeding movements by the drilling spindle. In the machine heretofore constructed, the means for traversing the tool spindle and the means for limiting the movement of the tool by the power transmission mechanism has been rotated with and at the same rate as the transverse shaft.

In control mechanism constructed in accordance with our invention, which is adapted for use on various types of drilling machines and which is illustrated as applied to an upright drilling machine, a control head for limiting the movement of the drill spindle by the power transmission mechanism is not rotated at same rate of speed as the transverse shaft. The head is geared to the transverse shaft so as to rotate preferably at a much less speed than the transverse shaft. Preferably the head is so geared to the transverse shaft as to rotate less than one complete rotation for the complete travel of the drill spindle. By so connecting the head to the transverse shaft it is possible to stop the movement of the drill spindle by the power transmission mechanism at each end of the spindle travel. Moreover a dial plate may be adjustably mounted to rotate with the head for limiting the drill to any predetermined movement.

Our invention furthermore provides means for effecting a quick and an accurate setting of the dial plate with respect to the adjusting head which supports it. Preferably worm teeth are formed on the outside of the adjusting head and a worm member which meshes with said worm teeth is pivotally mounted on the dial plate. The worm member on the dial plate may be rotated to effect a fine and an accurate adjustment of the dial plate with respect to the adjusting head or the worm member may be swung on its pivot for separating the worm from the worm teeth to permit a quick adjustment on the drill plate with respect to the adjusting head. The adjusting head is also provided with a number of observation clips which may be set on the head to indicate different settings of the dial plate.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
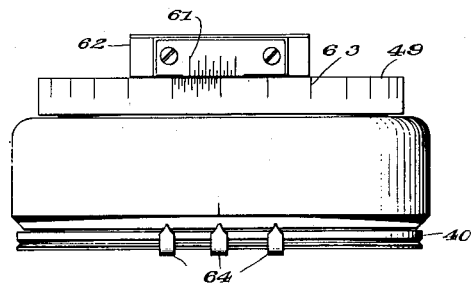
Figure 3:
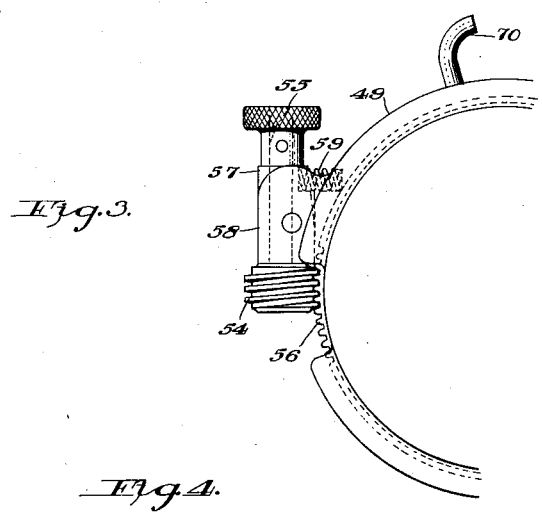
Figure 5:
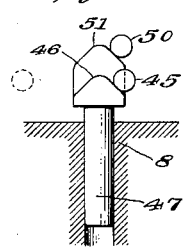
Figure 4:
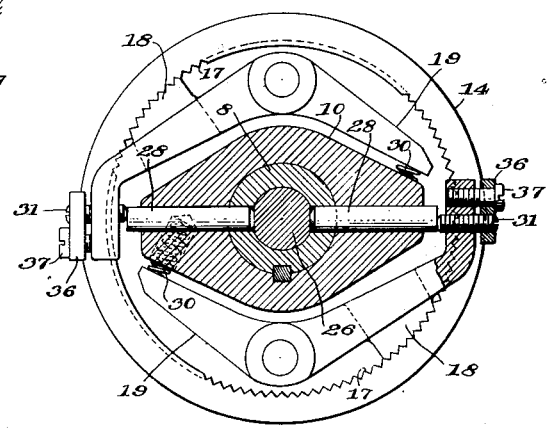

Fig. 1 is a sectional view of a drill head on an upright drill which is constructed in accordance with our invention. Fig. 2 is a plan view of the adjusting head. Fig. 3 is a detail view of the worm and worm wheel connection between the dial plate and the adjusting head. Fig. 4 is a sectional view along the line 4—4 of Fig. 1. Fig. 5 is a sectional view illustrating the cam rod which is operated by the adjusting head.

Referring to the drawings and particularly to Fig. 1, a drill head 1 is illustrated which comprises a main frame 2. The main frame 2 is connected to a suitable drill structure which is not illustrated. A more complete illustration of the construction of the drill head is deemed unnecessary inasmuch as our invention particularly relates to the means for effecting transitory movement of the drill carrying spindle. The drill carrying spindle 3, which carries a drilling tool (not shown) is supported in the main frame 2 by means of a sleeve member 4. A suitable bushing 5 is provided between the spindle 3 and the sleeve 4, as indicated in Fig. 1 of the drawings. The spindle 3 is rotated in a conventional manner and the sleeve 4 is given a linear movement in the manner hereinafter to be set forth.

A rack member 6, which is secured to the sleeve 4, meshes with pinion teeth 7 which are formed on a transverse shaft 8. If so desired, a separate pinion may be mounted on the shaft 8 for engaging the teeth of the rack 6. The shaft 8 extends transversely through the drill head 1 and serves as a connecting means for effecting not only feeding movements of the sleeve 4 but also as a connecting means for effecting traverse movement of the sleeve. One end of the shaft 8 is provided with a bearing in the main frame 2 and the opposite end of the shaft is provided with a bearing in a plate 10. The shaft 8 is also provided with a bearing in the main frame 2 between its end bearings as shown in Fig. 1 of the drawings.

A worm wheel 11, which is rotatably mounted on the shaft 8, meshes with a worm member 11a on a shaft 12. The shaft 12 is connected to a suitable source of power (not shown) and to a hand wheel 13. By means of the hand wheel 13 or the source of power (not shown), the sleeve 4 may be hand fed or power fed as desired. A collar member 14, which is secured to the worm wheel 11 by set screws 15, is provided with a recess 16 within which are formed teeth 17. The teeth 17 are adapted to mesh with two toothed segments 18 which are formed on levers 19 as best shown in Fig. 4 of the drawings. The levers 19 are pivotally mounted on the plate 10 and serve as connecting links between the power operated transmission mechanism and the shaft 8. The plate 10, as shown in Fig. 4 of the drawings, is keyed to the shaft 8. Thus, when the toothed segments 18 mesh with the teeth 17 a direct connection is provided between the power operated transmission mechanism and the sleeve member 4. The levers 19 are operated in a manner to be hereinafter set forth for connecting and disconnecting the power operated transmission mechanism to the sleeve member. The levers 19 and the parts directly associated therewith are referred to as a positive clutch in certain of the claims.

A rod 25, which is mounted in a recess formed in the shaft 8, is provided for controlling the opening and closing of the clutch mechanism by controlling the movement of the levers 19. One end of the rod 25 engages a control rod which is provided with cam surfaces 27. The cam surfaces 27 and the control rod are adapted to operate suitable pins 28. The pins 28 project through the plate 10, as best shown in Figs. 1 and 4 of the drawings. The pins 28 are adapted to control the levers 19. Referring to Fig. 4 of the drawings, it will be noted spring members 30, which are mounted on the plate 10, engage one end of each of the levers 19 for exerting a force tending to move the toothed segments 18 out of mesh with the teeth 17 on the collar member 14. The pins 28 engage set screws 31 on the opposite ends of the levers 19 and when the pins 28 are moved radially outwardly the levers 19 are given a movement of rotation in opposition to the springs 30 to effect meshing of the toothed segments 18 with the teeth 17. Thus, when the control rod 26 shown in Fig. 1 is moved axially in the direction of arrow a, the cam surfaces 27 move the pins 28 radially outward to effect meshing of the toothed segments 18 with the teeth 17. The axial movement of the rod 26 is controlled by hand levers 33 which are pivotally mounted on the plate 10. One end of each of the levers 33 is provided with a gear segment 34 which meshes with rack teeth 35 formed on the control rod 26. The hand levers 33 are secured in slots formed in the plate 10 and not only serve to control the movement of the rod 26 but also serve to effect traverse movements of the sleeve 4 and accordingly of the drill carrying spindle 3. Inasmuch as the plate 10 is keyed to the shaft 8 it is apparent such shaft 8 may be rotated by the hand levers 33 to effect traversing movement of the sleeve 4 whenever the clutch mechanism heretofore described is in an open position. A plate 36 and a set screw 37 are associated with each screw 31 for locking the latter in a set position.

An adjusting head 40 is rotatably mounted on a short shaft 41 which is secured to the main frame 2 as shown in Fig. 1 of the drawings. A recess 42 is formed in the head 40 adjacent to the frame 2 and gear teeth 43 are formed in such recess. A pinion 44, which is formed on the end of the shaft 8, meshes with the teeth 43 in order to effect movement of the head 40 in accordance with the linear movement of the sleeve 4. The gear teeth 43 and the pinion teeth on the end of the shaft 8 are so related as to effect less than one complete rotation of the head 40 for the complete travel of the sleeve member 4. By reason of the adjusting head 40 effecting less than one rotation for the complete travel of the sleeve member 4, it is possible to utilize the head for stopping the power operated feeding of the drill spindle when the drill spindle is near either end of its travel. The adjusting head 40 carries a pin 45 which is adapted to engage a cam surface 46 on a cam rod 47. The cam rod 47 engages one end of the rod 25 and serves to effect linear movement of the rod 25 to open the clutch mechanism. Such cam rod is operated to open the clutch mechanism when a hole is drilled to the required depth and when the sleeve member 4 is near either extreme end of its travel. The pin 45, which is mounted on the head 40, serves to engage the cam surface 46 and open the clutch mechanism when the sleeve member 4 is near either end of its travel.

An adjusting dial 49, which is rotatably mounted on the shaft 41, is provided for limiting the depth of the holes which are being drilled. A pin 50, which is carried by the dial plate 49 is adapted to engage a cam surface 51 on the cam rod 47. The cam surface 51 on the cam rod 47 is positioned in a slot 51ᵃ formed in the dial 49. The cam rod 47 is operated by the pin 50 in the same manner as it is operated by the pin 45 on the head 40.

A worm member 54, which is mounted on a shaft 55, meshes with teeth 56 which are formed on the periphery of the adjusting head 40 as best shown in Figs. 1 and 3 of the drawings. The shaft 55 is rotatably carried by a block 57 which is pivotally supported on a bracket 58 projecting from the dial plate 49. A spring member 59, which is positioned between the dial plate 49 and the block 57, exerts a force tending to hold the worm member 54 in mesh with the worm teeth 56 on the adjusting head. By means of such worm and worm tooth connection between the dial plate 49 and the adjusting head 40, an accurate adjustment of the plate may be effected with respect to the head by rotating the shaft 55. Moreover, a quick adjustment of the dial plate may be effected by moving the worm 54 out of mesh with the teeth 56 and rotating the dial plate. Such worm and worm tooth connection also serves as a means to compel the dial plate to rotate in accordance with the rotation of the adjusting head 40. The dial plate 49 is set in accordance with the depth of holes desired to be drilled and the pin 50 operates the cam rod 47 when such depth is reached to open the clutch and stop further feeding movement. In order to assist in rotating the rod 55 for moving the worm 54 away from the worm teeth 56, a projecting finger piece 70 is secured to the dial plate in position to be engaged by the finger of the operator.

The shaft 41 is pinned or otherwise secured to the frame 2 in order to prevent any rotative movement thereby. A reference scale 61 is mounted on a plate 62 which is fixedly secured to the shaft 41 as shown in Fig. 1 of the drawings. The reference scale 61 cooperates with a scale 63 formed on the dial plate 49 for effecting various settings of such dial plate. Suitable reference clips 64 are secured to the adjusting head 40 as shown in Figs. 1 and 2 of the drawings for marking various settings of the dial plate. The zero setting is obtained by moving the drill into engagement with the work and once the zero setting is obtained various other settings may be obtained and then marked by means of the reference clips 64.

In the above described structure it will be noted the adjusting head 40 and the dial plate 49 which are mounted on one side of the drill head 1 serves to stop the feeding movement of the drill spindle when said spindle is near either extreme end of its travel and also to stop the feeding movement when a hole has been drilled to the required depth. A feature to be noted in connection with the devices for throwing out the feed is that of the provision of the hereinbefore described positive clutch. The combined result is an instantaneous release of the clutch as distinguished from the delay or drag often present in disengaging friction elements. At the opposite side of the drill head is mounted means for connecting the power operated transmission mechanism to the drill spindle and also means for traversing the drill carrying spindle towards and away from the work.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of the United State:—

1. In a drilling machine, the combination comprising a drill spindle; means comprising a rotatable head for limiting the linear travel of said spindle; a dial plate mounted on said head for controlling the linear movement of said spindle; and a worm member rotatably mounted on said dial plate and meshing with worm teeth formed on said head for effecting a fine adjustment of the plate with respect to the head, said worm being demeshed from the worm threads to permit a quick adjustment of the plate.

2. In a drilling machine, the combination comprising a drill spindle; means comprising a rotatable head for limiting the linear travel of said spindle; a dial plate mounted on said head for controlling the linear movement of said spindle; a worm member rotatably mounted on said dial plate and meshing with worm teeth formed on said head for effecting a fine adjustment of the plate with respect to the head, said worm being demeshed from the worm to permit a quick adjustment of the plate; and observation clips adjustably secured to the head for indicating various settings of the dial plate.

3. In a drilling machine, the combination comprising a drill spindle; a transmission mechanism for feeding said spindle; a head for disconnecting said transmission mechanism from the spindle when the spindle is near either extreme end of its travel; a dial plate adjustably mounted on said head and serving to disconnect the transmission mechanism from the spindle after a predetermined linear movement of the spindle; and a disconnectible worm thread connection between said head and the dial plate for effecting adjustment of the plate with respect to the head.

4. In a machine tool, the combination comprising a rotatable head having worm teeth formed on the periphery thereof; a dial rotatably mounted adjacent to said head; a rotatable shaft pivotally mounted on said plate; a worm member mounted on said shaft and adapted to mesh with the worm teeth on the head; resilient means for exerting a force tending to hold the worm in mesh with said worm teeth; an operating knob secured to said shaft for rotating the worm when in mesh with the worm teeth to effect a fine adjustment of the plate with respect to the head; and a finger piece mounted on said plate for cooperating with said knob to facilitate the moving of said shaft on its pivot.

5. In a drilling machine, the combination comprising a drill spindle; mechanism for effecting linear feeding movements of said spindle; a head member rotated in accordance with the linear movement of said drill spindle; a dial plate; operative means for connecting said dial plate and head to effect adjustment therebetween and means for rendering said connection inoperative to allow free movement of either, said plate serving to control the linear movement of the drill spindle, and having graduations marked thereon; a scale having graduations marked thereon in accordance with the diameter of the drills and held in a stationary position, said scale having a limited adjustment to correct inaccuracies caused by wear; and observation clips adjustably secured to the head for indicating various settings of the dial plate.

6. In a drilling machine, the combination comprising a drill-spindle sleeve; means comprising a transverse shaft and a gear thereon engaging a rack on said sleeve for effecting linear movement of said sleeve; power operated transmission mechanism for rotating said transverse shaft; means comprising a control rod mounted in an orifice coaxially with said shaft for controlling the connecting and disconnecting of said transmission mechanism to and from said shaft; and means comprising a second rod engaging one end of said control rod and means for shifting said second rod for effecting movement thereof to disconnect the transmission mechanism from said shaft when the hole is drilled to depth.

7. In a drilling machine, the combination comprising a drill-spindle sleeve provided with a rack; power operated transmission mechanism including a pinion meshing with said rack for effecting linear movement of said sleeve; means comprising a control rod arranged co-axially with said pinion and movable in an axial direction for controlling the operative relation of said transmission mechanism to said sleeve; means comprising a member automatically actuated in accordance with the movement of the sleeve for engaging one end of said control rod when a hole is drilled to depth to disconnect the transmission mechanism from the sleeve and means for axially moving said control rod to connect said transmission mechanism to said sleeve.

8. In a drilling machine, the combination comprising a drill-spindle sleeve provided with a rack; transmission mechanism including a power driven shaft and a pinion thereon meshing with said rack for effecting linear movement of said sleeve; means comprising a control rod translatably mounted on said shaft and movable in an axial direction for controlling the operative relation of said transmission mechanism to said sleeve, manual means engaging one end of said rod to connect said transmission mechanism to start a drilling operation; and power mechanism operative in accordance with the movement of said sleeve member for engaging other end of said control rod to disconnect the transmission mechanism from the sleeve when the hole is drilled to the required depth.

9. In a drilling machine, the combination comprising a spindle sleeve; power operated transmission mechanism, a transverse shaft connected to and rotated in accordance with the linear movement of the sleeve; a clutch mechanism for connecting said shaft to the transmission mechanism; a head mechanism having internal gear teeth meshing with gear teeth rotated by said shaft; and means acting through the shaft and controlled by said head mechanism for operating said clutch to disconnect the transmission mechanism from said shaft.

10. In a drilling machine, the combination comprising a drill head; a drill spindle carried by said head; a transmission mechanism for feeding said spindle; manually actuated means controlled from one side of the head for connecting said transmission mechanism to said spindle; and means operated from the opposite side of the drill head for disconnecting the transmission mechanism from the spindle after a predetermined movement of the spindle and for disconnecting the transmission mechanism from the spindle when the spindle is near either extreme end of its travel.

11. In a drilling machine, the combination comprising a drill head; a drill spindle carried by said head; a power operated transmission mechanism for feeding said spindle; means controlled from one side of the head for connecting said transmission mechanism to said spindle; an adjusting head located on the opposite side of the drill head and operated in accordance with the linear movement of the spindle for disconnecting the transmission mechanism from the spindle when the spindle is near either extreme end of its travel; and a dial plate adjustably mounted on said head for disconnecting the transmission mechanism from the spindle when the spindle has been fed a predetermined distance.

12. In an upright drilling machine, the combination comprising a drill head; a spindle-shifting sleeve mounted on said drill-head; a power-operated transmission mechanism for translating said sleeve; means operated from one side of the drill head for connecting the transmission mechanism to said sleeve; an adjusting head located on the opposite side of said drill head and rotated in accordance with the movement of said sleeve, said adjusting head being rotated through less than one rotation for the complete travel of said sleeve; and means in position to be controlled by said adjusting head when rotated in opposite directions for disconnecting the transmission mechanism from the sleeve when the sleeve is near either extreme end of its travel.

13. In a drilling machine, the combination comprising a drill head; a spindle-shifting sleeve mounted on said head; a power-operated transmission mechanism for translating said sleeve; mechanism operated from one side of said drill head for connecting the transmission mechanism to said sleeve; an adjusting head located on the opposite side of said drill head; means operated by said adjusting head for releasing said transmission mechanism from the sleeve when the sleeve is near either extreme end of its travel and means operated by said adjusting head for releasing the transmission mechanism when the spindle has been fed a predetermined distance.

14. In an upright drilling machine the combination comprising a drill head; a drill spindle carried by said head; a rotary shaft having a driving connection for feeding said spindle; a transmission mechanism for rotating said shaft; means comprising a rod projecting through said head for connecting and disconnecting said transmission mechanism to and from said shaft; manual means at one side of said drive connection for shifting said rod to connect said transmission mechanism; and an adjusting head located at the opposite side of said driving connection and operated in accordance with the linear movement of said spindle and serving to engage said rod to disconnect the transmission mechanism from the shaft when the spindle is near either extreme end of its linear travel.

15. In an upright drilling machine, the combination comprising a drill head; a drill spindle carried by said head; a transmission mechanism for feeding said spindle; means comprising a rod projecting through said head for connecting and disconnecting said transmission mechanism to and from said spindle; an adjusting head operated in accordance with the linear movement of said spindle and serving to engage said rod to disconnect the transmission mechanism from the spindle when the spindle is near either extreme end of its linear movement; and a dial plate adjustably mounted on said adjusting head for operating said rod to disconnect the transmission mechanism from the spindle after a predetermined linear movement of the spindle.

16. In an upright drilling machine, the combination comprising a drill head; a drill spindle carried by said head; a transmission mechanism for feeding said spindle; means comprising a rod projecting through said head for connecting and disconnecting said transmission mechanism to and from said spindle; an adjusting head operated in accordance with the linear movement of said spindle and serving to engage said rod to disconnect the transmission mechanism from the spindle when the spindle is near either extreme end of its linear travel; and means carried by said adjusting head for operating the rod to stop the linear movement of the spindle after a predetermined linear movement of the spindle.

17. In an upright drilling machine, the combination comprising a drill head; a drill spindle carried by said head; a power operated transmission mechanism for feeding said spindle; means comprising a rod projecting through said head for connecting and disconnecting said transmission mechanism to and from said spindle; a cam rod for engaging the rod projecting through the head; an adjusting head mounted on one side of the drill head and rotated in accordance with the linear movement of said spindle; said head being rotated less than one complete rotation for the full linear movement of said drill spindle; and projecting means on said adjusting head for engaging said cam rod to disconnect the transmission mechanism from the spindle when the spindle is near either extreme end of its travel.

18. In an upright drilling machine, the combination comprising a drill head; a drill spindle carried by said head; a power operated transmission mechanism for feeding said spindle; means comprising a rod projecting through said head for connecting and disconnecting said transmission mechanism to said sleeve; an adjusting head mounted on one side of the drill head and rotated in accordance with the linear movement of said drill spindle; and projecting means on said adjusting head for operating said rod to disconnect the transmission mechanism from the spindle when the spindle is near either extreme end of its linear travel.

19. In a drilling machine, the combination comprising a spindle-shifting sleeve; a transverse shaft for operating said sleeve; a power operated transmission mechanism adapted to be connected to said shaft for translating the sleeve, a positive clutch mechanism for connecting said transmission mechanism to the shaft; a plate secured to said shaft; a control rod slidably mounted in said plate for controlling said clutch; levers mounted on said plate for operating said control rod to control said clutch and for rotating said shaft to effect traversing movements of the spindle-shifting sleeve; a rod extending through said shaft for operating said control rod to control the clutch; and means for operating said rod extending through the shaft to open the clutch when said sleeve is near either extreme end of its travel.

20. A drilling machine combining a drill head; a spindle sleeve mounted on the drill head; a power operated transmission mechanism mounted on the head and adapted to be connected to operate the sleeve; a positive clutch for connecting said transmission mechanism to operate the sleeve; means comprising an adjusting head mechanism rotated by said power operated transmission for disconnecting the clutch when the sleeve has moved to a predetermined depth; and means for disconnecting the clutch when the sleeve is at either extreme of its travel.

In witness whereof, we have hereunto subscribed our names.

DAVID C. KLAUSMEYER.
JOSEPH UTZ.